United States Patent
Nagarkar et al.

(10) Patent No.: US 8,230,189 B1
(45) Date of Patent: Jul. 24, 2012

(54) SYSTEMS AND METHODS FOR OFF-HOST BACKUPS OF STRIPED VOLUMES

(75) Inventors: Kuldeep Nagarkar, Pune (IN); Ashish Govind Khurange, Pune (IN)

(73) Assignee: Symantec Corporation, Mountain View, CA (US)

( * ) Notice: Subject to any disclaimer, the term of this patent is extended or adjusted under 35 U.S.C. 154(b) by 182 days.

(21) Appl. No.: 12/763,698

(22) Filed: Apr. 20, 2010

Related U.S. Application Data

(60) Provisional application No. 61/314,980, filed on Mar. 17, 2010.

(51) Int. Cl.
G06F 12/00 (2006.01)

(52) U.S. Cl. .............. 711/162; 711/114; 711/E12.103

(58) Field of Classification Search .................. None
See application file for complete search history.

(56) References Cited

U.S. PATENT DOCUMENTS

| | | | | |
|---|---|---|---|---|
| 5,742,792 | A * | 4/1998 | Yanai et al. | 711/162 |
| 5,745,915 | A | 4/1998 | Cooper et al. | |
| 6,678,768 | B1 * | 1/2004 | Craft | 710/100 |
| 7,051,155 | B2 * | 5/2006 | Talagala et al. | 711/114 |
| 7,155,569 | B2 * | 12/2006 | Johnson et al. | 711/114 |
| 7,296,135 | B2 * | 11/2007 | Thompson | 711/201 |
| 7,321,905 | B2 * | 1/2008 | Hartline et al. | 1/1 |
| 7,370,148 | B2 * | 5/2008 | Ikeuchi et al. | 711/114 |
| 7,380,059 | B2 * | 5/2008 | Burton | 711/113 |
| 7,380,157 | B2 * | 5/2008 | Brewer et al. | 714/6.2 |
| 7,398,418 | B2 * | 7/2008 | Soran et al. | 714/6.22 |
| 7,404,036 | B2 * | 7/2008 | Hyde et al. | 711/114 |
| 7,409,499 | B1 * | 8/2008 | Kiselev et al. | 711/114 |
| 7,418,621 | B2 * | 8/2008 | Ashmore | 714/6.2 |
| 7,421,537 | B2 * | 9/2008 | Corrado | 711/114 |
| 7,434,091 | B1 * | 10/2008 | Karr | 714/6.31 |
| 7,437,508 | B2 * | 10/2008 | Hajji | 711/114 |
| 7,487,289 | B2 * | 2/2009 | Ito et al. | 711/112 |
| 7,487,294 | B2 * | 2/2009 | Li et al. | 711/114 |
| 7,647,448 | B2 * | 1/2010 | Linder | 711/105 |
| 2002/0169995 | A1 * | 11/2002 | Archibald et al. | 714/6 |
| 2003/0204670 | A1 * | 10/2003 | Holt et al. | 711/112 |
| 2004/0123032 | A1 * | 6/2004 | Talagala et al. | 711/114 |
| 2008/0282105 | A1 * | 11/2008 | Deenadhayalan et al. | 714/6 |
| 2009/0055451 | A1 * | 2/2009 | Reimer et al. | 707/205 |
| 2010/0036858 | A1 | 2/2010 | Patel | |

OTHER PUBLICATIONS

AC&NC, "Raid Level 0+1: High Data Transfer Performance", Feb. 4, 2009, pp. 1-2, http://web.archive.org/web/20090204012125/http://acnc.com/04_01_0_1.html.*

Webopedia, "Metadata", Jan. 10, 1997, pp. 1-2, http://web.archive.org/web/20010405235507/http://www.webopedia.com/TERM/M/metadata.html.*

(Continued)

*Primary Examiner* — Edward Dudek, Jr.
*Assistant Examiner* — Christopher Birkhimer
(74) *Attorney, Agent, or Firm* — Advantedge Law Group

(57) ABSTRACT

A computer-implemented method for off-host backups of striped volumes may include identifying a striped volume of data on which to perform an off-host backup operation. The computer-implemented method may also include identifying a plurality of storage devices underlying the striped volume of data. The computer-implemented method may further include identifying stripe-aware extent metadata for the off-host backup operation. The computer-implemented method may additionally include reading data for the off-host backup operation from the plurality of storage devices in parallel using the stripe-aware extent metadata. Various other methods, systems, and computer-readable media are also disclosed.

20 Claims, 6 Drawing Sheets

OTHER PUBLICATIONS

WiseGeek, "What Is Metadata?", Dec. 11, 2009, pp. 1-2, http://web.archive.org/web/20091211232939/http://www.wisegeek.com/what-is-metadata.htm.*

MPCER, "What Is Metadata?", 2004, pp. 1-1, http://www.mpcer.nau.edu/metadata/WhatIsMetadata.htm.*

The PC Guide, "RAID Levels 0+1 (01) and 1+0 (10)", Apr. 17, 2001, pp. 1-2, http://www.pcguide.com/ref/hdd/perf/raid/levels/multLevel01-c.html.*

Robin Harris, "RAID 1+0 Is The Cadillac of RAID", May 8, 2007, pp. 1-3, http://www.zdnet.com/blog/storage/raid-1-0-is-the-cadillac-of-raid/131.*

Eberhard Karls Universitat Tubingen, "RAID—Redundant Arrays of Independent Disks", pp. 1-3, Aug. 22, 2003, http://web.archive.org/web/20030822220516/http://www-ti.informatik.uni-tuebingen.de/os390/io/raid01.pdf.*

Anindya Banerjee; Systems and Methods for Accounting for Underlying Storage When Accessing Files in Parallel; U.S. Appl. No. 12/711,488, filed Feb. 24, 2010.

Anindya Banerjee; Systems and Methods for Accounting for Underlying Storage When Accessing Files in Parallel; Non-Final Office Action received in U.S. Appl. No. 12/711,488, Oct. 26, 2011.

* cited by examiner

SYSTEMS AND METHODS FOR OFF-HOST BACKUPS OF STRIPED VOLUMES

CROSS REFERENCE TO RELATED APPLICATION

This application claims priority to U.S. Provisional Application No. 61/314,980, titled "Enhancing Off-Host Backup Performance" and filed 17 Mar. 2010, the disclosure of which is incorporated, in its entirety, by this reference.

BACKGROUND

In the digital age, organizations increasingly rely on digitally-stored data. To protect against data loss, an organization may use a backup system to back up important data. However, backing up data may consume network resources, potentially degrading the performance of a local area network.

In order to offload backup data transmission from a local area network, some backup systems may transmit backup data over a storage area network. For example, a volume of data to be backed up may be stored on a storage system connected to a storage area network. A backup system may also be connected to the storage area network. The backup system may accordingly retrieve data from the storage system.

However, in this configuration the backup system may read only raw data from the storage device (i.e., without filesystem-level data). For example, the backup system may be responsible for backing up multiple heterogeneous clients (i.e., using different storage stack elements) and may be unable to read data from the various clients at the file system level. Therefore, in order to perform file-level backup operations, the host system of the volume may need to send metadata to the backup system across the local area network. For example, the host system may send extent data to help the backup system to map files to blocks of data on the storage device.

Unfortunately, if the volume of data is a striped volume (e.g., striped across multiple storage devices in the storage system), the extent data may include a very large number of extents. For example, extent data for a file of 22 GB on a striped volume where the stripe size is 64 KB may include 360448 extents. Reading each extent sequentially may consume a large amount of time, slowing the backup process considerably. In some cases, the severity of this slowing may even prevent a backup from completing within a designated backup window.

SUMMARY

As will be described in greater detail below, the instant disclosure generally relates to systems and methods for off-host backups of striped volumes. Embodiments of the instant disclosure may perform off-host backups of striped volumes using stripe-aware extent metadata (e.g., extent metadata treating an extent striped across multiple disks as such rather than as separate extents) in order to read data for the off-host backups in parallel from the underlying storage devices. For example, a method may include identifying a striped volume of data on which to perform an off-host backup operation, identifying a plurality of storage devices underlying the striped volume of data, identifying stripe-aware extent metadata for the off-host backup operation, and then reading data for the off-host backup operation from the plurality of storage devices in parallel using the stripe-aware extent metadata.

The method may be performed in a variety of contexts. For example, the off-host backup may include backing up a file in the striped volume of data. Additionally or alternatively, the off-host backup may include backing up the entire striped volume of data.

Identifying the stripe-aware extent metadata may include identifying a variety of information. For example, identifying the stripe-aware extent metadata may include identifying metadata including a stripe size, a number of storage devices in the plurality of storage devices, a base offset for a striped extent for each storage device in the plurality of storage devices, a total length of the striped extent, and/or a number of stripes of the striped extent.

Additionally, identifying the stripe-aware extent metadata may include a variety of approaches. For example, identifying the stripe-aware extent metadata may include identifying a host system that manages the striped volume of data and then receiving the stripe-aware extent metadata from the host system. Additionally or alternatively, identifying the stripe-aware extent metadata may include generating the stripe-aware extent metadata. In some examples, generating the stripe-aware extent metadata may include identifying raw extent metadata for the striped volume of data, identifying a pattern in the raw extent metadata implying striping in the striped volume of data, and generating the stripe-aware extent metadata based on the pattern in the raw extent metadata.

Reading the data for the off-host backup operation from the plurality of storage devices in parallel using the stripe-aware extent metadata may include a variety of steps. For example, reading the data may include allocating a buffer for the data. In some examples, allocating the buffer for the data may include allocating a buffer of a size of a stripe multiplied by a number of storage devices in the plurality of storage devices. In some examples, reading the data in parallel may include reading a stripe size of data from each storage device in the plurality of storage devices simultaneously. In some additional examples, the method may also include writing the data for the off-host backup operation to a backup storage system.

In some examples, a system for off-host backups of striped volumes may include an identification module, a striping module, and a backup module. The identification module may be programmed to identify a striped volume of data on which to perform an off-host backup operation and to identify a plurality of storage devices underlying the striped volume of data. The striping module may be programmed to identify stripe-aware extent metadata for the off-host backup operation. The backup module may be programmed to read data for the off-host backup operation from the plurality of storage devices in parallel using the stripe-aware extent metadata.

The system may operate in a variety of contexts. For example, the off-host backup may include backing up a file in the striped volume of data. Additionally or alternatively, the off-host backup may include backing up the entire striped volume of data.

The identification module may be programmed to identify the stripe-aware extent metadata by identifying a variety of information. For example, the identification module may be programmed to identify the stripe-aware extent metadata by identifying metadata including a stripe size, a number of storage devices in the plurality of storage devices, a base offset for a striped extent for each storage device in the plurality of storage devices, a total length of the striped extent, and/or a number of stripes of the striped extent.

Additionally, the striping module may be programmed to identify the stripe-aware extent metadata with a variety of approaches. For example, the striping module may be programmed to identify the stripe-aware extent metadata by identifying a host system that manages the striped volume of data and then receiving the stripe-aware extent metadata from the host system. Additionally or alternatively, the striping module may be programmed to identify the stripe-aware extent metadata by generating the stripe-aware extent metadata. In some examples, the striping module may be programmed to generate the stripe-aware extent metadata by identifying raw extent metadata for the striped volume of data, identifying a pattern in the raw extent metadata implying striping in the striped volume of data, and generating the stripe-aware extent metadata based on the pattern in the raw extent metadata.

The backup module may be programmed to read the data for the off-host backup operation from the plurality of storage devices in parallel using the stripe-aware extent metadata with a variety of steps. For example, the backup module may be programmed to read the data which may include allocating a buffer for the data. In some examples, the backup module may be programmed to allocate the buffer for the data by allocating a buffer of a size of a stripe multiplied by a number of storage devices in the plurality of storage devices. In some examples, the backup module may be programmed to read the data in parallel by reading a stripe size of data from each storage device in the plurality of storage devices simultaneously. In some additional examples, the backup module may be further programmed to write the data for the off-host backup operation to a backup storage system.

In some embodiments, a computer-readable-storage medium may include one or more computer-executable instructions that, when executed by at least one processor of a computing device, cause the computing device to identify a striped volume of data on which to perform an off-host backup operation, identify a plurality of storage devices underlying the striped volume of data, identify stripe-aware extent metadata for the off-host backup operation, and then read data for the off-host backup operation from the plurality of storage devices in parallel using the stripe-aware extent metadata.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
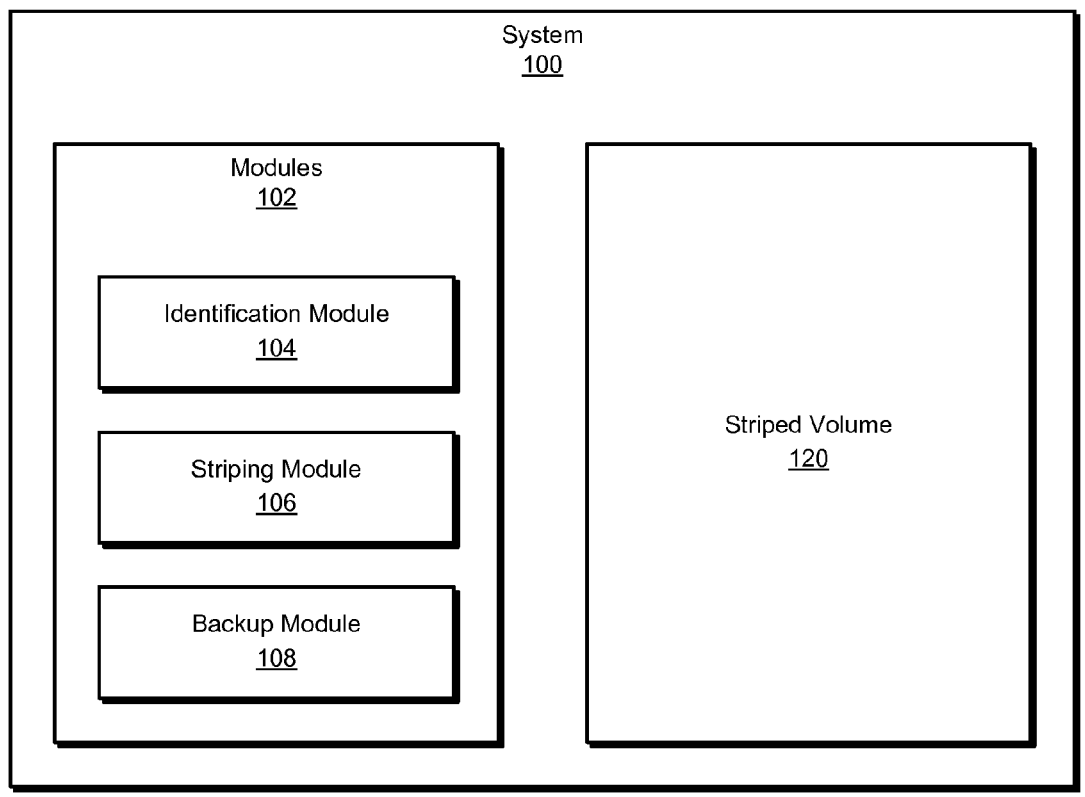
FIG. 1 is a block diagram of an exemplary system for off-host backups of striped volumes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for off-host backups of striped volumes. Systems and methods described herein may perform off-host backups of striped volumes by using stripe-aware extent metadata (e.g., extent metadata treating an extent striped across multiple disks as such rather than as separate extents) to read from storage devices underlying striped volumes in parallel. By using stripe-aware extent metadata to read from the storage devices in parallel (e.g., without mounting the striped volume), systems and methods described herein may reduce backup time by reducing the time necessary to read raw backup data.

Figure 2:
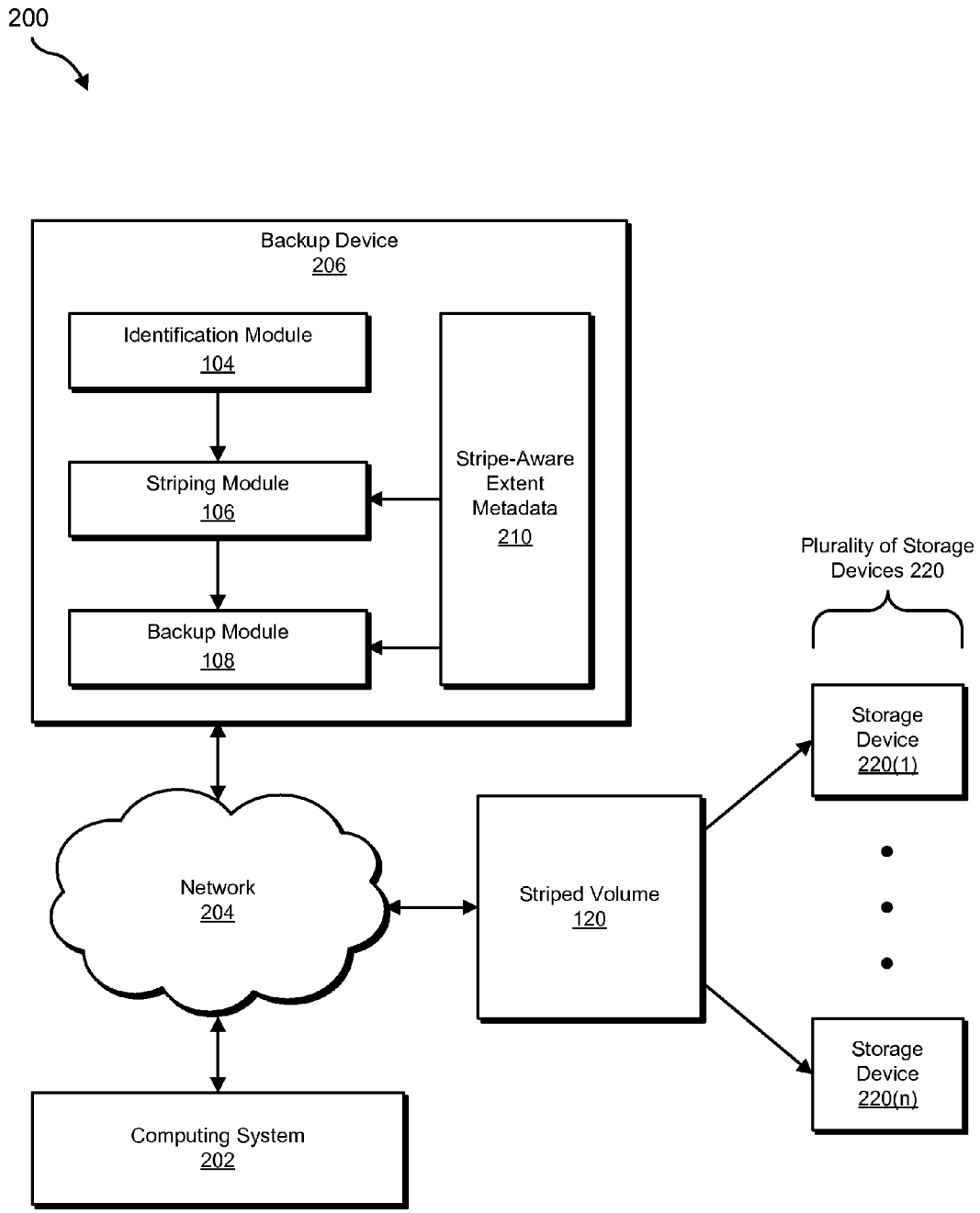
FIG. 2 is a block diagram of an exemplary system for off-host backups of striped volumes.
Figure 3:
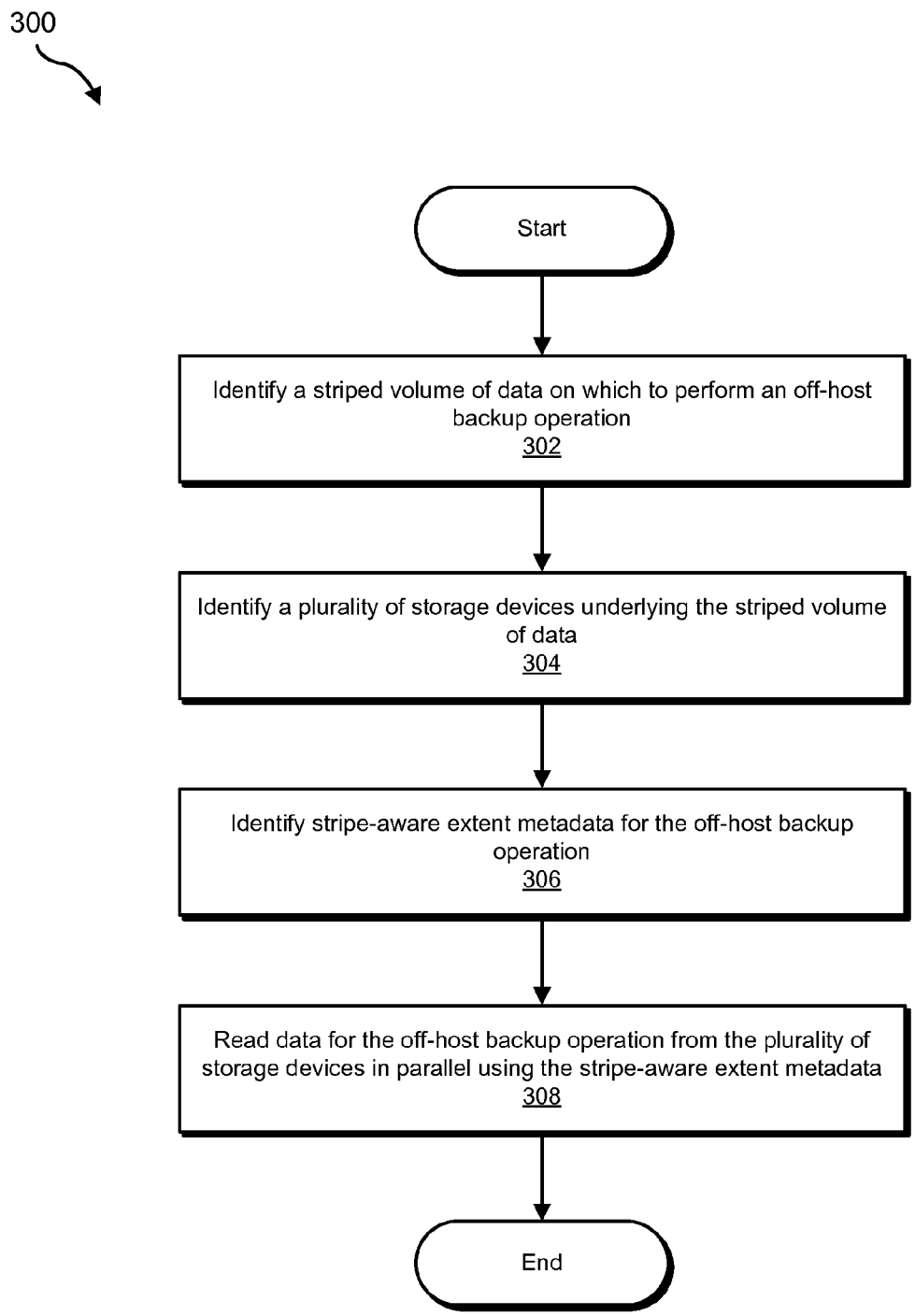
FIG. 3 is a flow diagram of an exemplary method for off-host backups of striped volumes.
Figure 4:
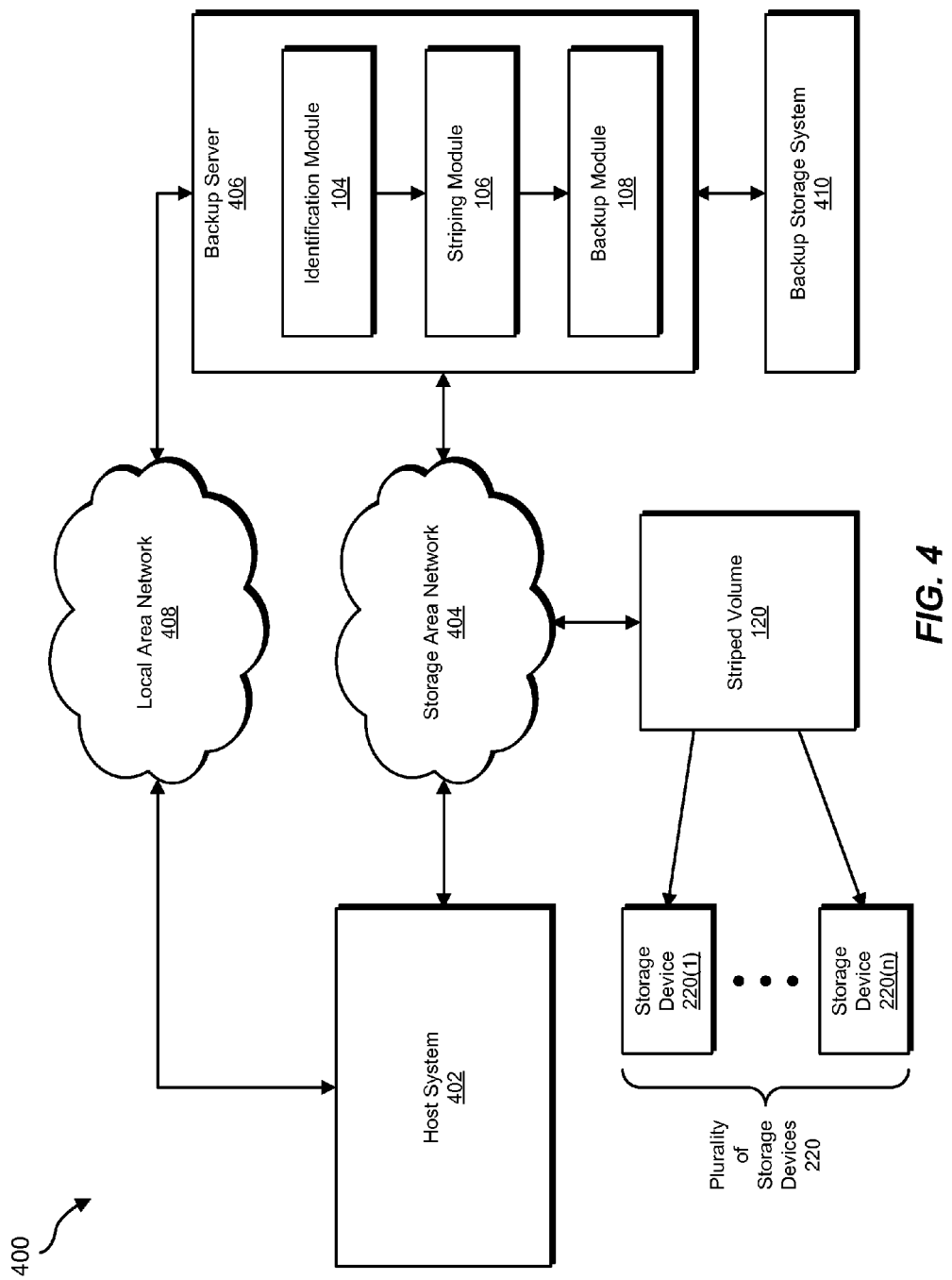
FIG. 4 is a block diagram of an exemplary system for off-host backups of striped volumes.

The following will provide, with reference to FIGS. 1, 2, and 4, detailed descriptions of exemplary systems for off-host backups of striped volumes. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for off-host backups of striped volumes. As illustrated in this figure, exemplary system 100 may include one or more modules 102 for performing one or more tasks. For example, and as will be explained in greater detail below, exemplary system 100 may include an identification module 104 programmed to identify a striped volume of data on which to perform an off-host backup operation and to identify a plurality of storage devices underlying the striped volume of data. Exemplary system 100 may also include a striping module 106 programmed to identify stripe-aware extent metadata for the off-host backup operation.

In addition, and as will be described in greater detail below, exemplary system 100 may include a backup module 108 programmed to read data for the off-host backup operation from the plurality of storage devices in parallel using the stripe-aware extent metadata. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or backup device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a striped volume 120. Striped volume 120 may represent portions of a single volume or storage device or a plurality of volumes or storage devices. For example, striped volume 120 may represent a portion computing system 510 in FIG. 5 and/or portions of exemplary network architecture 600 in FIG. 6. Alternatively, striped volume 120 in FIG. 1 may represent one or more physically separate devices capable of being accessed by a computing device, such as computing system 202 in FIG. 2, backup device 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a backup device 206 via a network 204. A striped volume 120 may be stored on a plurality of storage devices 220 also accessible via network 204. In one embodiment, and as will be described in greater detail below, backup device 206 may include an identification module 104, a striping module 106, and a backup module 108.

Identification module 104 may be programmed to identify a striped volume of data on which to perform an off-host backup operation. For example, identification module 104 may identify striped volume 120. Identification module 104 may also be programmed to identify a plurality of storage devices underlying the striped volume of data. For example, identification module 104 may identify plurality of storage devices 220.

Striping module 106 may be programmed to identify stripe-aware extent metadata for the off-host backup operation. For example, striping module 106 may identify stripe-aware extent metadata 210.

Backup module 108 may be programmed to read data for the off-host backup operation from the plurality of storage devices in parallel using the stripe-aware extent metadata. For example, backup module 108 may read data for the off-host backup operation from plurality of storage devices 220 in parallel using stripe-aware extent metadata 210.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Backup device 206 generally represents any type or form of computing device that is capable of performing and/or facilitating backup operations. Examples of backup device 206 include, without limitation, backup servers, third-party copy devices, and data movers.

Network 204 generally represents any medium or architecture capable of facilitating communication or data transfer. Examples of network 204 include, without limitation, an intranet, a storage area network (SAN), a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and backup device 206.

FIG. 3 is a flow diagram of an exemplary computer-implemented method 300 for off-host backups of striped volumes. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a striped volume of data on which to perform an off-host backup operation. For example, at step 302 identification module 104 may, as part of backup device 206 in FIG. 2, identify striped volume 120.

As used herein, the phrase "striped volume" may refer to may refer to any volume, drive, or other allocation of storage space that includes non-contiguous storage space distributed across multiple storage devices. In some examples, the striped volume may be stored on a storage area network (e.g., on one or more storage devices connected to the storage area network, such as a redundant array of disks). For example, FIG. 4 illustrates an exemplary system 400 with a storage area network 404 and a local area network 408. As illustrated in FIG. 4, storage area network 404 may facilitate communication between striped volume 120 (e.g., plurality of storage devices 220), a host system 402, and a backup server 406 (e.g., allowing both host system 402 and backup server 406 to access data stored in striped volume 120).

In some examples, the off-host backup operation may be performed with a backup device connected to the storage area network. Using FIG. 4 as an example, the off-host backup operation may be performed with backup server 406 connected to storage area network 404. As used herein, the phrase "off-host backup" may refer to any backup of data where at least some of the backup procedure is offloaded from a computing device (or "host") to another system and/or device. For example, an "off-host backup" may refer to a LAN-free backup (e.g., a backup in which data may be moved directly from the host to SAN-attached storage devices, circumventing LAN traffic). Additionally or alternatively, an "off-host backup" may refer to a server-free backup (e.g., a backup device reading from storage devices to back up data rather than requiring a host system to send data for backup).

The off-host backup operation may be of any suitable scope. For example, the off-host backup operation may include backing up a file of the striped volume of data (e.g., backing up data for each extent that comprises the file). Additionally or alternatively, the off-host backup operation may include backing up the entire striped volume of data (e.g., backing up data for all extents that comprise the volume).

Returning to FIG. 3, at step 304 one or more of the systems described herein may identify a plurality of storage devices underlying the striped volume of data. For example, at step 304 identification module 104 may, as part of backup device 206 in FIG. 2, identify plurality of storage devices 220. As an additional example, at step 304 identification module 104 may, as part of backup server 406 in FIG. 4, identify plurality of storage devices 220.

Identification module 104 may perform step 304 in any suitable manner. For example, identification module 104 may identify the plurality of storage devices by reading a configuration file identifying the plurality of storage devices. Additionally or alternatively, identification module 104 may receive a message identifying the plurality of storage devices. Using FIG. 4 as an example, identification module 104 may receive a message from host system 402 via local area network 408 identifying plurality of storage devices 220.

Returning to FIG. 3, at step 306 one or more of the systems described herein may identify stripe-aware extent metadata for the off-host backup operation. For example, at step 306 striping module 106 may, as part of backup device 206 in FIG. 2, identify stripe-aware extent metadata 210. As an additional example, at step 306 striping module 106 may, as part of backup server 406 in FIG. 4, identify stripe-aware extent metadata for an off-host backup operation of striped volume 120.

As used herein, the term "extent" may refer to any contiguous portion of storage allocated for a file (or any other suitable data object). In some examples, a file may include several extents which may be located on various parts of a storage device. Likewise, as used herein, the phrase "extent metadata" may refer to any data indicating and/or locating the position, placement, and/or address of one or more extents. For example, "extent metadata" may include information indicating a storage device and/or an address of the storage device at which an extent is stored. "Extent metadata" may also include information indicating the length of an extent and/or a file that includes the extent. Furthermore, as used herein, the phrase "stripe-aware extent metadata" may refer to any extent metadata that leverages information about a striped volume to express information about extents more efficiently (e.g., so that extent metadata may be more compressed, more efficient to transmit, more efficient to process, etc.) and/or to aid in parallel reading and/or processing of extents.

For example, striping module 106 may generate the stripe-aware metadata by generating a variety of information. Examples of such information include, but are not limited to: stripe size (e.g., the size of each stripe written to each storage device), a number of storage devices in the plurality of storage devices (e.g., the stripe width), a base offset for a striped extent for each storage device in the plurality of storage devices, the total length of the striped extent (e.g., the stripe size multiplied by the stripe width), and/or the number of stripes of the striped extent. As used herein, the term "striped extent" may refer to any data that is contiguous on a volume level but which is striped across multiple storage devices.

The stripe-aware extent metadata may use any suitable format. In some examples, the stripe-aware extent metadata may include human-readable text. The following is one example of stripe-aware metadata:

STRIPE_BEGIN, 4, 0 k
devicea, oa, 64 k
deviceb, ob, 64 k
devicec, oc, 64 k
deviced, od, 64 k
STRIPE_END, 128, 32768 k where "STRIPE_BEGIN" may indicate the beginning of stripe-aware metadata, "4" may indicate the number of devices under the striped volume, "0 k" may represent a placeholder for a consistent format for parsing, "devicea" through "deviced" may represent the storage devices, "oa" through "od" may represent the respective offsets of the striped extent on the storage devices, "64 k" may represent the stripe size, "128" may represent the number of times to loop to read the entire striped extent, and "32768 k" may represent the total length of the striped extent at the volume level.

A generalized grammar for the above example may be expressed by:

Ex—E' Ex|D' Ex|null
E'—E1 E'|null
E1—device_name, offset, length
D'—D1 E' D2
D1—STRIPE_BEGIN, number of underlying disks, 0 k
D2—STRIPE_END, stripe repetition, total size where extents (Ex) may be represented as striped extents (D') or traditional extents (E1) in the case that the backup operation includes data from an unstriped volume.

The stripe-aware extent metadata may also include alternative formats for different storage device configurations. The following is an example of stripe-aware extent metadata for a RAID 5 configuration:

RAID5_BEGIN, 4, 0 k
[LEFT|RIGHT], parity_index, 0 k
devicea, oa, 64 k
deviceb, ob, 64 k
devicec, oc, 64 k
deviced, od, 64 k
RAID5_END, 128, 32768 k where "RAID5_BEGIN" may indicate the beginning of stripe-aware metadata for a RAID 5 configuration, "4" may indicate the number of devices under the striped volume, "0 k" may represent a placeholder for a consistent parsing format, "LEFT" or "RIGHT" may indicate whether the parity is left rotating or right rotating, "parity_index" may represent an index into the following device list on which the parity lies for the first rotation round, "devicea" through "deviced" may represent the storage devices, "oa" through "od" may represent the respective offsets of the striped extent on the storage devices, "64 k" may represent the stripe size, "128" may represent the number of times to loop to read the entire striped extent, and "32768 k" may represent the total length of the striped extent at the volume level. Additionally, the following is an example of stripe-aware extent metadata for a RAID 6 configuration:

RAID6_BEGIN, 4, 0 k
[LEFT|RIGHT], parity_index1, 0 k
[LEFT|RIGHT], parity_index2, 0 k
devicea, oa, 64 k
deviceb, ob, 64 k
devicec, oc, 64 k
deviced, od, 64 k
RAID6_END, 128, 32768 k where "RAID6_BEGIN" may indicate the beginning of stripe-aware metadata for a RAID 6 configuration, "4" may indicate the number of devices under the striped volume, "0 k" may represent a placeholder for a consistent parsing format, "LEFT" or "RIGHT" may indicate whether the parity is left rotating or right rotating, "parity_index1" may represent an index into the following device list on which the first parity lies, "parity_index2" may represent an index into the following device list on which the second parity lies, "devicea" through "deviced" may represent the storage devices, "oa" through "od" may represent the respective offsets of the striped extent on the storage devices, "64 k" may represent the stripe size, "128" may represent the number of times to loop to read the entire striped extent, and "32768 k" may represent the total length of the striped extent at the volume level.

Returning to step 306 in FIG. 3, striping module 106 may identify the stripe-aware extent metadata in a variety of ways. For example, striping module 106 may identify a host system that manages the striped volume of data and receive the stripe-aware extent metadata from the host system. Using FIG. 4 as an example, striping module 106 may identify host system 402 as managing striped volume 120 (e.g., by reading from a configuration file linking host system 402 with striped volume 120, by receiving a message from host system 402 relating to striped volume 120, etc.). Striping module 106 may then receive the stripe-aware extent metadata from host system 402. For example, host system 402 may generate stripe-aware extent metadata based on local knowledge of features of striped volume 120 and raw extent metadata. Host system 402 may then transmit the stripe-aware extent metadata to backup server 406 (e.g., via local area network 408). In this manner, even though backup server 406 may only be able to read raw data from plurality of storage devices 220 (e.g., because backup server 406 may lack the ability to read volumes in the format of striped volume 120), backup server 406 may acquire extent metadata formatted to allow backup server 406 to read data in striped volume 120 from plurality of storage devices 220 in parallel.

In some examples, striping module 106 may identify the stripe-aware extent metadata by generating the stripe-aware extent metadata. Striping module 106 may generate the stripe-aware extent metadata in any suitable manner. For example, striping module 106 may receive extent metadata from a host system capable of reading the striped volume and transform the extent metadata into stripe-aware extent metadata. In one example, striping module 106 may generate the stripe-aware extent metadata by identifying raw extent metadata for the striped volume of data, identifying a pattern in the raw extent metadata implying striping in the striped volume of data, and then generating the stripe-aware extent metadata based on the pattern in the raw extent metadata.

As used herein, the phrase "raw extent metadata" may refer to any extent metadata that is not stripe-aware (e.g., does not leverage information about striping of a volume). Striping module 106 may identify the raw extent metadata for the striped volume of data in any suitable manner. Using FIG. 4 as an example, striping module 106 may identify the raw extent metadata by receiving the raw extent metadata from host system 402.

Striping module 106 may identify the pattern in the raw extent metadata in any suitable manner. For example, striping module 106 may identify a series of extents on the plurality of storage devices stored at regular offset intervals. Using an earlier example of a possible format for extent metadata striping module 106 may identify the following raw extent metadata:

devicea, oa, 64 k
deviceb, ob, 64 k
devicec, oc, 64 k
deviced, od, 64 k
devicea, oa+64 k, 64 k
deviceb, ob+64 k, 64 k
devicec, oc+64 k, 64 k
deviced, od+64 k, 64 k
devicea, oa+2*64 k, 64 k
deviceb, ob+2*64 k, 64 k
devicec, oc+2*64 k, 64 k
deviced, od+2*64 k, 64 k
. . .
devicea, oa+127*64 k, 64 k
deviceb, ob+127*64 k, 64 k
devicec, oc+127*64 k, 64 k
deviced, od+127*64 k, 64 k where "devicea" through "deviced" may represent the storage devices, "oa" through "od" may represent the respective offsets of the striped extent on the storage devices, and "64 k" may represent the stripe size. In this example, striping module 106 may then generate stripe-aware extent metadata based the raw metadata by recognizing that each subsequent offset of an extent on a storage device is increased by the stripe size (64 k). In this example, striping module 106 may accordingly generate:

STRIPE_BEGIN, 4
devicea, oa, 64 k
deviceb, ob, 64 k
devicec, oc, 64 k
deviced, od, 64 k
STRIPE_END, 128, 32768 k where "STRIPE_BEGIN" may indicate the beginning of stripe-aware metadata, "4" may indicate the number of devices under the striped volume, "devicea" through "deviced" may represent the storage devices, "oa" through "od" may represent the respective offsets of the striped extent on the storage devices, "64 k" may represent the stripe size, "128" may represent the number of times to loop to read the entire striped extent, and "32768 k" may represent the total length of the striped extent at the volume level.

Returning to FIG. 3, at step 308 one or more of the systems described herein may read data for the off-host backup operation from the plurality of storage devices in parallel using the stripe-aware extent metadata. For example, at step 308 backup module 108 may, as part of backup device 206 in FIG. 2, read data for the off-host backup operation from plurality of storage devices 220 in parallel using stripe-aware extent metadata 210. As an additional example, at step 308 backup module 108 may, as part of backup server 406 in FIG. 4, read data for the backup operation of host 402 from plurality of storage devices 220 in parallel using the stripe-aware extent metadata.

Backup module 108 may perform step 308 in any suitable manner. For example, backup module 108 may read the data in parallel by first allocating a buffer for the data. For example, backup module 108 may allocate a buffer large enough to read data in parallel from the plurality of storage devices. In some examples, backup module 108 may allocate a buffer of a size of a stripe multiplied by the number of storage devices in the plurality of storage devices. For example, if the stripe size is 64 k and there are four storage devices in the plurality of storage devices, backup module 108 may allocate a buffer of size 256 k.

In some examples, backup module 108 may read the data by reading a stripe size of data from each storage device in the plurality of storage devices simultaneously. For example, if the stripe size is 64 k, backup module 108 may read 64 k of data from each storage device in the plurality of storage devices at the same time. In this manner, backup module 108 may reduce the time required by the backup operation by not requiring that data be read sequentially from storage devices in the plurality of storage devices. In some examples, by reading from the storage devices in parallel, backup module 108 may reduce the backup time by approximately a factor of n, where n equals the number of storage devices in the plurality of storage devices. After step 308 method 300 in FIG. 3 may terminate.

In some examples, methods and systems described herein may also write the data for the off-host backup operation to a backup storage system. For example, backup module 108 may, as part of backup server 406 in FIG. 4, write the data to a backup storage system 410. For example, backup module 108 may write data previously read into a buffer of a size of a stripe multiplied by the number of storage devices in the plurality of storage devices to the backup storage system.

Figure 5:
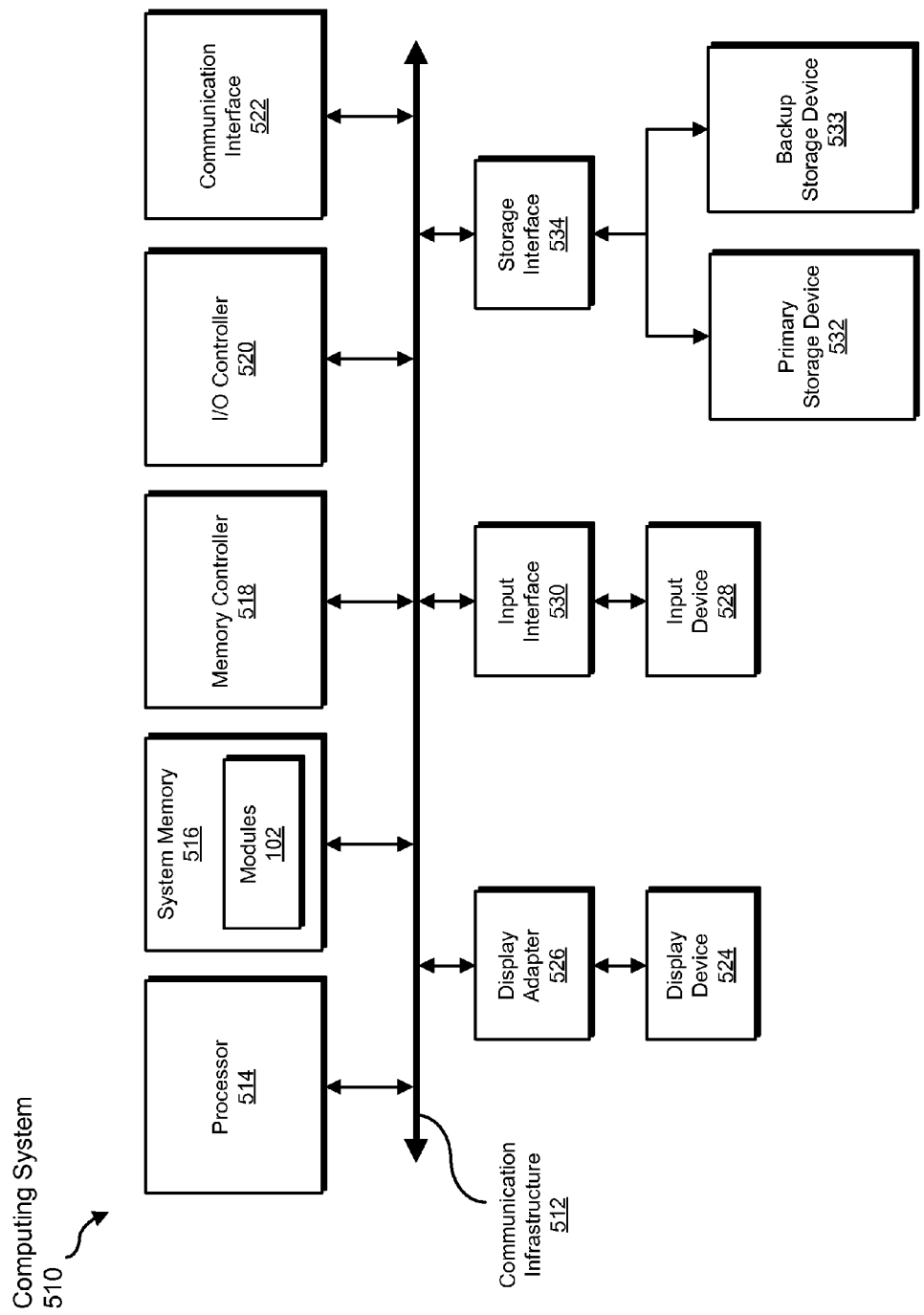
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, receiving, generating, reading, allocating, and/or writing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, receiving, generating, reading, allocating, and/or writing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, receiving, generating, reading, allocating, and/or writing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, receiving, generating, reading, allocating, and/or writing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, receiving, generating, reading, allocating, and/or writing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, receiving, generating, reading, allocating, and/or writing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
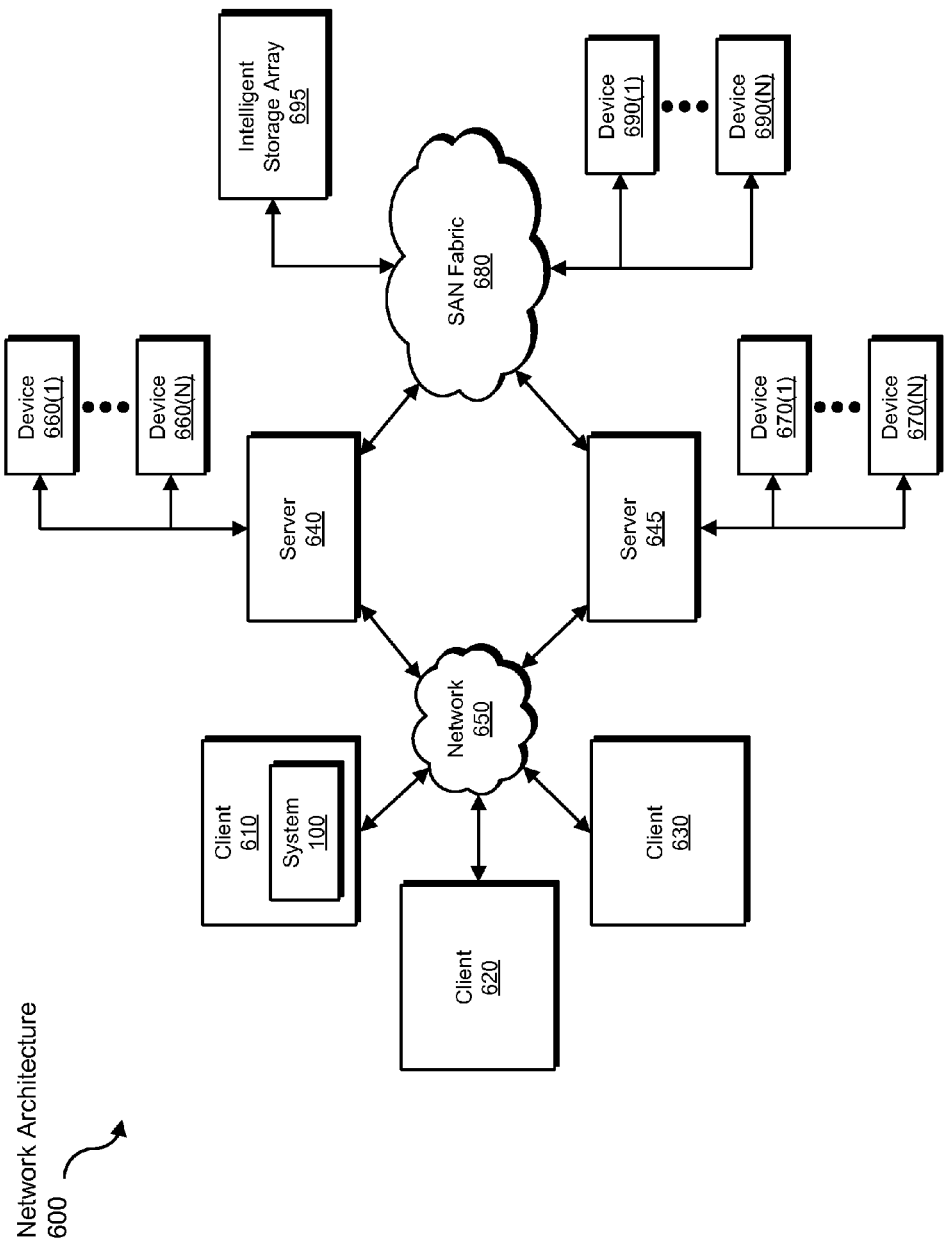
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, receiving, generating, reading, allocating, and/or writing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for off-host backups of striped volumes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup device into an efficient backup device leveraging stripe-aware extent metadata to perform parallel reads. Additionally or alternatively, one or more of the modules described herein may transform raw extent metadata into stripe-aware extent metadata.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for off-host backups of striped volumes, at least a portion of the method being performed by a computing device comprising at least one processor, the method comprising:
identifying a striped volume of data on which to perform an off-host backup operation;
identifying a plurality of storage devices underlying the striped volume of data;
identifying stripe-aware extent metadata for the off-host backup operation;
transmitting the stripe-aware extent metadata to an off-host backup system;
reading, at the off-host backup system remote from the striped volume of data, data for the off-host backup operation from the plurality of storage devices in parallel using the stripe-aware extent metadata and without mounting the striped volume.

2. The computer-implemented method of claim 1, wherein the stripe-aware extent metadata comprises at least one of:
a stripe size;
a number of storage devices in the plurality of storage devices;
a base offset for a striped extent for each storage device in the plurality of storage devices;
a total length of the striped extent;
a number of stripes of the striped extent.

3. The computer-implemented method of claim 1, wherein reading the data from the plurality of storage devices in parallel comprises allocating a buffer for the data.

4. The computer-implemented method of claim 3, wherein allocating the buffer comprises allocating a buffer of a size of a stripe multiplied by a number of storage devices in the plurality of storage devices.

5. The computer-implemented method of claim 1, wherein reading the data from the plurality of storage devices in parallel comprises reading a stripe size of data from each storage device in the plurality of storage devices simultaneously.

6. The computer-implemented method of claim 1, wherein identifying the stripe-aware extent metadata comprises:
identifying a host system that manages the striped volume of data;
receiving, at the off-host backup system, the stripe-aware extent metadata from the host system.

7. The computer-implemented method of claim 1, wherein the off-host backup operation comprises a server-free backup in which the data for the off-host backup operation is read directly from the striped volume of data instead of being sent from the striped volume of data to the off-host backup system.

8. The computer-implemented method of claim 1, wherein:
identifying the stripe-aware extent metadata comprises generating the stripe-aware extent metadata;
generating the stripe-aware extent metadata comprises identifying raw extent metadata for the striped volume of data, identifying a pattern in the raw extent metadata implying striping in the striped volume of data, and generating the stripe-aware extent metadata based on the pattern in the raw extent metadata.

9. The computer-implemented method of claim 1, wherein:
the off-host backup system lacks the ability to directly read the striped volume of data;
the stripe-aware extent metadata enables the off-host backup system to read raw data from the plurality of storage devices.

10. The computer-implemented method of claim 1, further comprising writing the data for the off-host backup operation to a backup storage system.

11. A system for off-host backups of striped volumes, the system comprising:
an identification module programmed to:
identify a striped volume of data on which to perform an off-host backup operation;
identify a plurality of storage devices underlying the striped volume of data;
a striping module programmed to identify stripe-aware extent metadata for the off-host backup operation and transmit the stripe-aware extent metadata to an off-host backup system;
a backup module programmed to read, at an off-host backup system remote from the striped volume of data, data for the off-host backup operation from the plurality of storage devices in parallel using the stripe-aware extent metadata and without mounting the striped volume of data;
at least one hardware processor configured to execute the identification module, the striping module, and the backup module.

12. The system of claim 11, wherein the stripe-aware extent metadata comprises at least one of:
a stripe size;
a number of storage devices in the plurality of storage devices;
a base offset for a striped extent for each storage device in the plurality of storage devices;
a total length of the striped extent;
a number of stripes of the striped extent.

13. The system of claim 11, wherein the backup module is programmed to read the data from the plurality of storage devices in parallel by allocating a buffer for the data.

14. The system of claim 13, wherein the backup module is programmed to allocate the buffer by allocating a buffer of a size of a stripe multiplied by a number of storage devices in the plurality of storage devices.

15. The system of claim 11, wherein the backup module is programmed to read the data from the plurality of storage devices in parallel by reading a stripe size of data from each storage device in the plurality of storage devices simultaneously.

16. The system of claim 11, wherein the striping module is programmed to identify the stripe-aware extent metadata by:
identifying a host system that manages the striped volume of data;
receiving, at the off-host backup system, the stripe-aware extent metadata from the host system.

17. The system of claim 11, wherein the striping module is programmed to identify the stripe-aware extent metadata by generating the stripe-aware extent metadata.

18. The system of claim 17, wherein the striping module is programmed to generate the stripe-aware extent metadata by:
identifying raw extent metadata for the striped volume of data;
identifying a pattern in the raw extent metadata implying striping in the striped volume of data;
generating the stripe-aware extent metadata based on the pattern in the raw extent metadata.

19. The system of claim 11, wherein the backup module is further programmed to write the data for the off-host backup operation to a backup storage system.

20. A non-transitory computer-readable-storage medium comprising one or more computer-executable instructions that, when executed by at least one processor of a computing device, cause the computing device to:
identify a striped volume of data on which to perform an off-host backup operation;
identify a plurality of storage devices underlying the striped volume of data;
identify stripe-aware extent metadata for the off-host backup operation;
transmit the stripe-aware extent metadata to an off-host backup system;
read, at an off-host backup system remote from the striped volume of data, data for the off-host backup operation from the plurality of storage devices in parallel using the stripe-aware extent metadata and without mounting the striped volume of data.

* * * * *